US012633801B2

(12) United States Patent
Rosengren et al.

(10) Patent No.: US 12,633,801 B2
(45) Date of Patent: May 19, 2026

(54) LINEAR ACTUATOR SYSTEM WITH INTEGRATED TRANSVERSE FLUX MOTOR

(71) Applicant: Tolomatic, Inc., Hamel, MN (US)

(72) Inventors: Gary W. Rosengren, Brooklyn Park, MN (US); Ryan H. Bourgoine, Buffalo, MN (US)

(73) Assignee: Tolomatic, Inc., Hamel, MN (US)

( * ) Notice: Subject to any disclaimer, the term of this patent is extended or adjusted under 35 U.S.C. 154(b) by 198 days.

(21) Appl. No.: 18/116,492

(22) Filed: Mar. 2, 2023

(65) Prior Publication Data

US 2023/0208268 A1     Jun. 29, 2023

Related U.S. Application Data

(63) Continuation of application No. PCT/US2021/048876, filed on Sep. 2, 2021.

(Continued)

(51) Int. Cl.
*H02K 7/06*          (2006.01)
*F16D 121/24*       (2012.01)
(Continued)

(52) U.S. Cl.
CPC .............. *H02K 7/06* (2013.01); *H02K 1/278* (2013.01); *H02K 3/28* (2013.01); *H02K 21/145* (2013.01);
(Continued)

(58) Field of Classification Search
CPC ........ H02K 21/145; H02K 1/278; H02K 7/06; H02K 3/525; H02K 2201/12; F16D 2121/24; F16D 2125/40
(Continued)

(56) References Cited

U.S. PATENT DOCUMENTS 2,286,931 A     6/1942  Radeke
2,930,289 A     3/1960  Swarts
(Continued)

FOREIGN PATENT DOCUMENTS

AU     2002365571 A1     6/2003
CN     100342618 C       10/2007
(Continued)

OTHER PUBLICATIONS

Translation of DE 10050352 C1 (Year: 2002).*

(Continued)

*Primary Examiner* — Oluseye Iwarere
*Assistant Examiner* — Daniel K Schlak
(74) *Attorney, Agent, or Firm* — DORSEY & WHITNEY LLP

(57)          ABSTRACT

An integrated motor linear actuator system includes one or more stator stages inside a housing. The stator stages have a winding and a stator core disposed about a common longitudinal axis, with a plurality of stator teeth configured to guide magnetic flux generated by the winding. A rotor is disposed along the longitudinal axis, within the stator stages, with a plurality of magnetic poles distributed circumferentially about the outer surface, adjacent the stator teeth, so that the stator stages are configured to drive the rotor into rotational motion about the longitudinal axis via the magnetic flux. A thrust tube and screw assembly are operationally coupled to the rotor, and configured to convert the rotational motion into linear motion of the thrust tube.

28 Claims, 6 Drawing Sheets

Related U.S. Application Data

(60) Provisional application No. 63/073,630, filed on Sep. 2, 2020.

(51) Int. Cl.

| | |
|---|---|
| *F16D 125/40* | (2012.01) |
| *H02K 1/278* | (2022.01) |
| *H02K 3/28* | (2006.01) |
| *H02K 21/14* | (2006.01) |
| *H02K 1/14* | (2006.01) |
| *H02K 1/16* | (2006.01) |
| *H02K 9/22* | (2006.01) |

(52) U.S. Cl.
CPC ...... *F16D 2121/24* (2013.01); *F16D 2125/40* (2013.01); *H02K 1/145* (2013.01); *H02K 1/165* (2013.01); *H02K 9/225* (2021.01); *H02K 2201/12* (2013.01)

(58) Field of Classification Search
USPC .................................................. 310/156.02
See application file for complete search history.

(56) References Cited

U.S. PATENT DOCUMENTS

| | | | |
|---|---|---|---|
| 3,820,437 A | 6/1974 | Dyer et al. | |
| 4,578,005 A | 3/1986 | Fuse et al. | |
| 4,966,506 A | 10/1990 | Slanker | |
| 5,099,161 A * | 3/1992 | Wolfbauer, III | F16H 25/20 |
| | | | 310/80 |
| 5,784,922 A * | 7/1998 | Ozaki | H02K 7/06 |
| | | | 74/89.37 |
| 6,223,971 B1 * | 5/2001 | Sato | F16H 25/20 |
| | | | 228/45 |
| 6,297,472 B1 | 10/2001 | Bong et al. | |
| 6,492,751 B1 * | 12/2002 | Ineson | H02K 37/14 |
| | | | 310/71 |
| 6,531,798 B1 * | 3/2003 | Palmero | H02K 16/00 |
| | | | 310/12.32 |
| 6,664,704 B2 | 12/2003 | Calley | |
| 6,924,579 B2 | 8/2005 | Calley | |
| 7,657,984 B2 | 2/2010 | Hopkins et al. | |
| 7,863,797 B2 | 1/2011 | Calley | |
| 7,868,508 B2 | 1/2011 | Calley et al. | |
| 7,923,886 B2 | 4/2011 | Calley et al. | |
| 7,994,678 B2 | 8/2011 | Calley et al. | |
| 8,030,819 B2 | 10/2011 | Calley et al. | |
| 8,053,944 B2 | 11/2011 | Calley et al. | |
| 8,193,679 B2 | 6/2012 | Calley et al. | |
| 8,222,786 B2 | 7/2012 | Calley et al. | |
| 8,242,658 B2 | 8/2012 | Calley et al. | |
| 8,395,291 B2 | 3/2013 | Calley et al. | |
| 8,405,275 B2 | 3/2013 | Calley et al. | |
| 8,415,848 B2 | 4/2013 | Calley et al. | |
| 8,749,108 B2 | 6/2014 | Dyer et al. | |
| 8,760,023 B2 | 6/2014 | Calley et al. | |
| 8,833,749 B2 | 9/2014 | Park | |
| 8,836,196 B2 | 9/2014 | Calley et al. | |
| 8,854,171 B2 | 10/2014 | Janecek | |
| 8,952,590 B2 | 2/2015 | Calley et al. | |
| 8,970,205 B2 | 3/2015 | Janecek et al. | |
| 8,994,243 B2 | 3/2015 | Calley et al. | |
| 9,006,951 B2 | 4/2015 | Janecek et al. | |
| 9,211,606 B2 | 12/2015 | Tiberghien | |
| 9,236,773 B2 | 1/2016 | Janecek et al. | |
| 9,360,020 B2 | 6/2016 | Janecek | |
| 9,457,417 B2 | 10/2016 | Jochman | |
| 9,509,181 B2 | 11/2016 | Janecek et al. | |
| 9,618,003 B2 | 4/2017 | Janecek et al. | |
| 10,946,474 B2 | 3/2021 | Stecker et al. | |
| 2004/0036370 A1 * | 2/2004 | Hilzinger | H02K 37/04 |
| | | | 310/216.106 |
| 2005/0253469 A1 * | 11/2005 | Hochhalter | F16H 25/20 |
| | | | 310/68 B |

| | | | |
|---|---|---|---|
| 2006/0266146 A1 * | 11/2006 | Waide | H02K 7/102 |
| | | | 74/424.92 |
| 2007/0152522 A1 * | 7/2007 | Enomoto | H02K 7/116 |
| | | | 310/12.01 |
| 2008/0018196 A1 * | 1/2008 | Enomoto | H02K 1/145 |
| | | | 310/43 |
| 2008/0042525 A1 * | 2/2008 | Shin | H02K 21/145 |
| | | | 310/90 |
| 2008/0164784 A1 * | 7/2008 | Huang | H02K 5/15 |
| | | | 310/49.01 |
| 2010/0032419 A1 * | 2/2010 | Matsumoto | B23K 11/31 |
| | | | 219/134 |
| 2011/0169357 A1 * | 7/2011 | Gieras | B64C 13/50 |
| | | | 310/83 |
| 2011/0203396 A1 * | 8/2011 | Hyun | F16H 29/02 |
| | | | 74/116 |
| 2011/0221298 A1 | 9/2011 | Calley et al. | |
| 2012/0025637 A1 | 2/2012 | Calley et al. | |
| 2012/0119599 A1 | 5/2012 | Calley et al. | |
| 2012/0119610 A1 | 5/2012 | Calley et al. | |
| 2012/0210810 A1 * | 8/2012 | Nakamura | F16H 25/2409 |
| | | | 74/89.34 |
| 2012/0234108 A1 | 9/2012 | Janecek et al. | |
| 2012/0235668 A1 | 9/2012 | Janecek et al. | |
| 2013/0002061 A1 | 1/2013 | Janecek et al. | |
| 2013/0113320 A1 | 5/2013 | Calley et al. | |
| 2013/0169096 A1 | 7/2013 | Calley et al. | |
| 2013/0234554 A1 * | 9/2013 | Tanaka | H02K 1/145 |
| | | | 310/156.02 |
| 2013/0264905 A1 | 10/2013 | Calley et al. | |
| 2013/0278098 A1 * | 10/2013 | Bourqui | H02K 7/06 |
| | | | 310/156.01 |
| 2014/0042851 A1 * | 2/2014 | Takemoto | H02K 1/243 |
| | | | 29/598 |
| 2014/0167539 A1 * | 6/2014 | Neuhaus | H02K 5/161 |
| | | | 310/80 |
| 2014/0300228 A1 * | 10/2014 | Rapp | F16H 25/20 |
| | | | 310/80 |
| 2015/0048712 A1 | 2/2015 | Janecek et al. | |
| 2015/0147188 A1 | 5/2015 | Danielsson | |
| 2015/0162786 A1 | 6/2015 | Janecek et al. | |
| 2015/0308438 A1 | 10/2015 | Janecek | |
| 2015/0369252 A1 | 12/2015 | Janecek et al. | |
| 2017/0321795 A1 * | 11/2017 | Rosengren | F16H 25/20 |
| 2018/0029156 A1 | 2/2018 | Dunn et al. | |
| 2018/0248444 A1 * | 8/2018 | Chen | H02K 1/145 |
| 2018/0248445 A1 * | 8/2018 | Chen | H02K 37/14 |
| 2020/0164457 A1 | 5/2020 | Rosengren et al. | |
| 2021/0044192 A1 * | 2/2021 | Galehr | H02K 3/28 |
| 2023/0068576 A1 | 3/2023 | Rosengren et al. | |

FOREIGN PATENT DOCUMENTS

| | | | | |
|---|---|---|---|---|
| CN | 102227862 A | 10/2011 | | |
| CN | 102257708 A | 11/2011 | | |
| CN | 102257709 A | 11/2011 | | |
| CN | 102986115 A | 3/2013 | | |
| CN | 102959832 B | 11/2016 | | |
| CN | 108233619 A | 6/2018 | | |
| DE | 2650953 A1 * | 5/1977 | | H02K 7/06 |
| DE | 10050352 C1 * | 1/2002 | | H02K 7/06 |
| DK | 2686939 T3 | 3/2020 | | |
| EP | 1806825 A2 | 7/2007 | | |
| EP | 1461854 B1 | 5/2011 | | |
| EP | 2342802 A2 | 7/2011 | | |
| EP | 2342803 A2 | 7/2011 | | |
| EP | 2541734 A2 | 1/2013 | | |
| EP | 2548287 A1 | 1/2013 | | |
| EP | 2641316 B1 | 2/2019 | | |
| EP | 2548289 B1 | 11/2019 | | |
| EP | 2686939 B1 | 12/2019 | | |
| EP | 3080895 B1 | 7/2020 | | |
| JP | 4476627 B2 | 3/2010 | | |
| JP | 2012507983 A | 3/2012 | | |
| JP | 2012508549 A | 4/2012 | | |
| JP | 2012508555 A | 4/2012 | | |
| JP | 5748161 B2 | 5/2015 | | |
| KR | 20110083803 A | 7/2011 | | |

(56)                References Cited

FOREIGN PATENT DOCUMENTS

| | | | |
|---|---|---|---|
| KR | 20110084902 A | 7/2011 | |
| KR | 20110086063 A | 7/2011 | |
| TW | 201230615 A | 7/2012 | |
| TW | 201230622 A | 7/2012 | |
| TW | 201244332 A | 11/2012 | |
| TW | I450839 B | 9/2014 | |
| TW | I451663 B | 9/2014 | |
| WO | 03047067 A2 | 6/2003 | |
| WO | WO-03091593 A1 * | 11/2003 | ........... H02K 1/2791 |
| WO | 2010062764 A2 | 6/2010 | |
| WO | 2010062765 A2 | 6/2010 | |
| WO | 2010062766 A2 | 6/2010 | |
| WO | 2011115633 A1 | 9/2011 | |
| WO | 2011115634 A1 | 9/2011 | |
| WO | 2012067893 A2 | 5/2012 | |
| WO | 2012067895 A2 | 5/2012 | |
| WO | 2012067896 A2 | 5/2012 | |
| WO | 2012123822 A2 | 9/2012 | |
| WO | 2012125790 A2 | 9/2012 | |
| WO | 2013003639 A2 | 1/2013 | |
| WO | 2013070743 A1 | 5/2013 | |
| WO | 2015088597 A1 | 6/2015 | |
| WO | 2015089518 A1 | 6/2015 | |
| WO | 2015163871 A1 | 10/2015 | |

OTHER PUBLICATIONS

Translation of WO 200391593 A1 (Year: 2003).*
"What is a direct drive motor?" Electric Torque Machines, downloaded from <https://etmpower.com/learn-more/what-is-a-direct-drive-motor/>, 5 pages.
Guo et al. "Study of permanent magnet transverse flux motors with soft magnetic composite core," AUPEC (2004), 6 pages.
Tong, Wei. "Transverse Flux Motor," Mechanical Design of Electric Motors: Innovative and Advanced Motor Design, (2014) pp. 656-660.
Woo et al. "Variation of electric properties between surface permanent magnet and interior permanent magnet motor," AMDP, vol. 6 (2012) pp. 109-114.
International Search Report and Written Opinion dated Jan. 4, 2022 in connection with International Patent Application No. PCT/US2021/048876, 17 pages.
Communication pursuant to Article 94(3) EPC dated Dec. 22, 2025 in connection with European Patent Application No. 21778656.5, 7 pages.

* cited by examiner

LINEAR ACTUATOR SYSTEM WITH INTEGRATED TRANSVERSE FLUX MOTOR

CROSS-REFERENCE TO RELATED APPLICATION

This patent application is a continuation of International Patent Application No. PCT/US2021/048876, filed Sep. 2, 2021, which claims priority to U.S. Provisional Application Ser. No. 63/073,630, "Linear Actuator System with Integrated Transverse Flux Motor," filed Sep. 2, 2020, which is incorporated by reference herein.

FIELD

This patent application relates to integrated motor actuator technology. More generally, the application relates to an integrated motor actuator for use in automation systems, including, but not limited to, robot-carried and stationary resistance welding devices, programmable machine tools, and other automated manufacturing, processing and handling applications.

BACKGROUND

Industrial automation systems utilize a wide range of robot and actuator technologies, which can be adapted for automated manufacturing processes including robotic welding, computer numerical control (CNC) machine tool applications, injection molding, fixture clamping, surface coating, and product handling, packaging, and assembly, as well as testing and inspection. Actuator technologies are also used in high-volume, high-speed and precision production and manufacturing processes, where speed, accuracy, endurance, service life and operational costs are important engineering factors, as well as power-to-weight ratio, size envelope, stroke length and thermal performance.

In automated welding and programmable machine tool applications, actuators can be arranged to position a welding gun, machine tool or other apparatus with respect to a workpiece. Suitable actuator technologies include both linear and rotary actuator systems, which can be adapted for short-stroke clamping operations, part selection, assembly, packaging, coatings, product inspection and testing, and other automation applications. The actuator can be attached to a robot arm, pedestal, or machining fixture, and programmed to position an end effector, electrode, welding gun or other machine tool component for spot or resistance welding, arc welding, projection welding, friction stir welding, precision machine tooling, and other automated machine processes.

Across these different applications, actuator speed, precision and service life are important design considerations, along with actuator system size and weight, energy efficiency, reliability, and thermal performance. There is a continuing need for improved linear actuator designs that can meet these increasing system demands, while providing the desired thrust, torque, speed, and positioning accuracy, within a desired size and weight envelope, and at reasonable cost.

SUMMARY

A linear actuator system includes a transverse flux motor disposed within an integrated motor actuator housing. One or more stator stages can be coupled to the inner surface of the housing, with a rotor disposed within the stator stages.

Each of the stator stages includes a winding, e.g., a bobbin-type winding or annular coil, and a stator core with a plurality of stator teeth distributed circumferentially about a common longitudinal axis, at the inner diameter of the stator core. The rotor is disposed about the axis inside the stator stages, with a plurality of magnetic poles distributed circumferentially along an outer surface, adjacent the stator teeth.

A screw assembly can be operationally coupled to the rotor, with a thrust tube coupled to the screw assembly. For example, the screw assembly can include a roller nut coupled to a screw shaft, and configured to convert rotational motion of the rotor (about the longitudinal axis) into linear motion of the thrust tube (along the longitudinal axis). The winding is configured to generate magnetic flux in response to a current, and the flux is guided by the stator core to drive the rotor. The flux path is oriented transverse to the direction of rotational motion of the rotor, as defined at the outer surface of the rotor.

An integrated motor actuator includes a transverse flux motor with one or more stator stages disposed within a housing. The stator stages include a winding and a stator core disposed about a common axis. A rotor is disposed within the one or more stator stages, which are configured to drive the rotor in rotational motion about the axis by guiding the magnetic flux along a flux path through the respective stator cores, transverse to the rotational motion of the rotor. A screw assembly can be operationally coupled to the rotor and a thrust tube can be coupled to the screw assembly, converting the rotational motion of the rotor into linear motion of the thrust tube.

Methods for manufacturing and operating such actuator systems include coupling one or more stator stages to the inner surface of a housing, disposing a rotor inside the stator stages, and coupling a screw assembly to the rotor. The stator stages have a winding and a stator core with a plurality of stator teeth distributed circumferentially about a common longitudinal axis, at an inner diameter of the stator core. The rotor has a plurality of magnetic poles distributed circumferentially along an outer surface, adjacent the stator teeth. The stator stages are configured to drive the rotor by guiding magnetic flux along a transverse flux path, and the screw assembly is adapted to convert the rotational motion into linear motion of the thrust tube.

BRIEF DESCRIPTION OF THE DRAWINGS

The drawings illustrate various features of the actuator system. These features are representative. Different variations and modifications are also encompassed within the disclosure, and as defined by the language of the appended claims.

DETAILED DESCRIPTION

Figure 1:
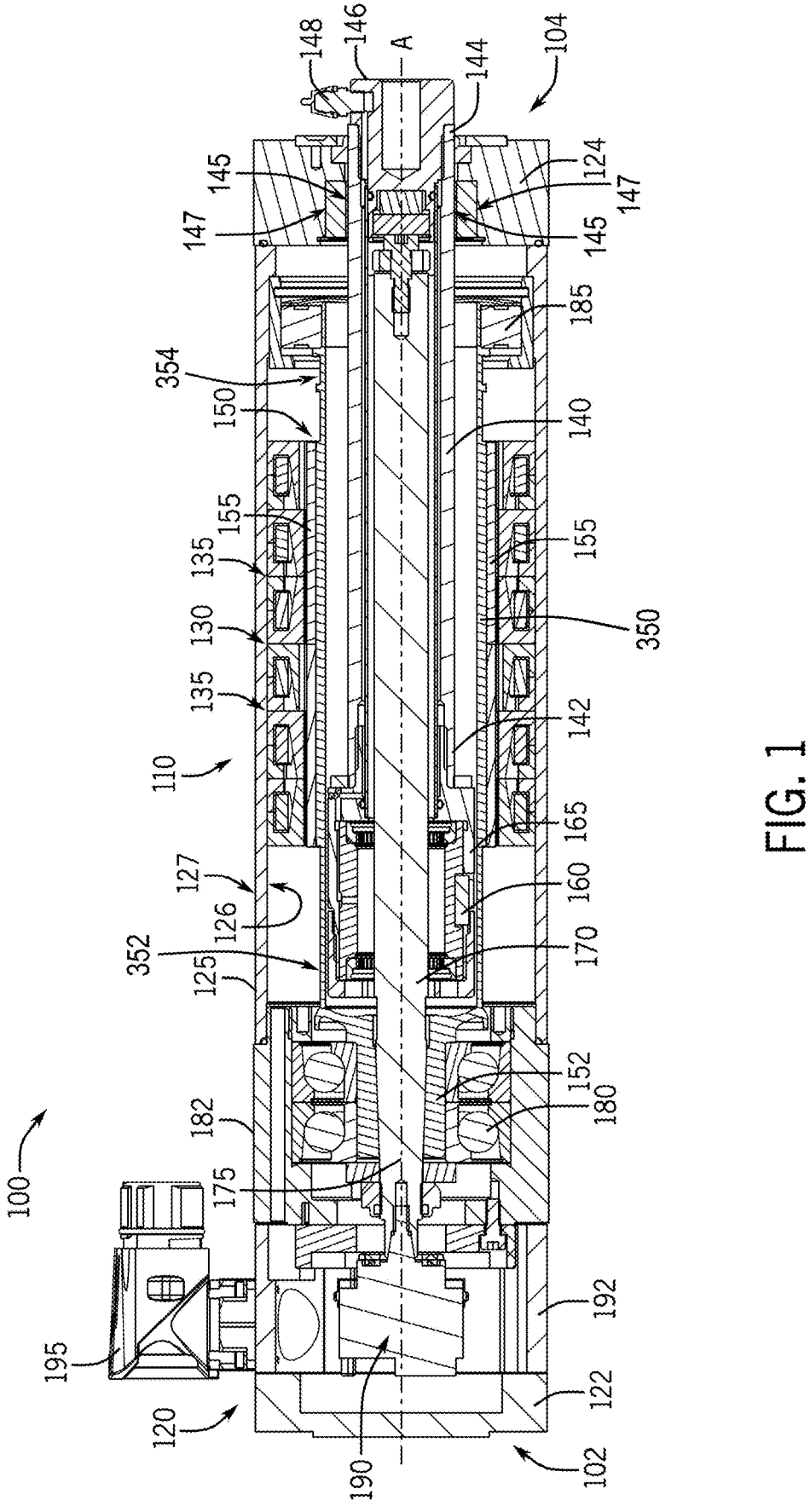
FIG. 1 is a section view of linear actuator system with an integrated transverse flux motor.

FIG. 1 is a section view of a linear actuator system 100 with an integrated, transverse flux motor 110 is disposed within a common, integrated motor actuator housing 120. A stator 130 is arranged within the housing 120, along with a thrust tube 140, a rotor assembly with a hollow core rotor 150, and a screw assembly with a nut 160 and screw shaft 170. Rotor 150 is coaxially disposed within the stator 130, extending about thrust tube 140 and screw shaft 170 along a common longitudinal axis A. Screw shaft 170 can have an externally threaded configuration, coupled with an internally threaded nut 160, or an inverted screw design, with internal threads inside the hollow core rotor 150.

System 100 provides a compact, efficient motor actuator design adaptable for a variety of automation applications and service environments. In this particular example, stator 130 includes two three-phase transverse-flux motor (TFM) stator assemblies or stacks 135, which are coupled to a central portion 125 of housing 120 along the inner surface 126, opposite the outer surface 127. A hollow core, surface-mounted permanent magnet (SPM) rotor 150 is coaxially disposed within the central portion 125 of the housing 120, with magnets 155 disposed on the outer surface of rotor 150, adjacent the stator stacks 135. The screw assembly includes a nut 160 and screw shaft 170, which can be an externally threaded screw, or the screw assembly can use an inverted screw design with internal threads inside the hollow core rotor 150. A thrust tube 140 is coupled to the nut 160, which engages screw shaft 170 to convert rotational motion of the rotor 150, rotating clockwise or counterclockwise about longitudinal axis A, into linear motion of thrust tube 140, reciprocating back and forth along axis A.

Housing 120 can be formed of a suitable metal material such as aluminum, or from a steel alloy or composite material. As shown in FIG. 1, the central portion 125 of housing 120 extends from the front end cap 124, at the distal end 104 of housing 120, to a main bearing assembly 180, disposed within a separate housing 182. Stator 130 is coupled to the inner surface 126 of the central housing portion 125, opposite outer surface 127, and rotor 150 is coaxially disposed within the stator 130, extending about screw shaft 170 along the common longitudinal axis A. An encoder or feedback device 190 is provided within a separate control housing 192 coupled between main bearing housing 182 and back end cap 122, at the proximal end 102 of housing 120. Depending on embodiment, the central portion 125 of housing 120 can also be continuously formed, and incorporate any of the end caps 122 and 124, main bearing housing 182, and control housing 192.

Thrust tube 140 extends from a first end 142, disposed toward the proximal or back end 102 of the actuator system 100 and housing 120, to a second end 144, toward the distal or front end 104. The first end 142 of thrust tube 140 is coupled to the nut (or nut assembly) 160, which can be disposed at least partially or wholly within the hollow core rotor 150. A nut housing 165 or other axial load-bearing bearing component can be provided for coupling the thrust tube 140 to the nut 165, or they can be directly coupled. The second (distal) end 144 of the thrust tube 140 is disposed outside the front end 104 of the housing 120, for example with a fitting 146 for coupling with an end effector or other tool component, and an external lubrication port 148.

In this particular example, screw shaft 170 is externally threaded, and rotationally coupled to the rotor 150 at a hub portion 152, supported by a main roller bearing assembly 180. An internally threaded nut 160, for example a roller nut, is coupled about the externally threaded screw shaft 170, and adapted to convert rotational motion of rotor 150 about axis A to longitudinal motion of thrust tube 140 along axis A. Alternatively, nut 160 and screw shaft 170 can be provided with a roller screw coupling, ACME thread, ball screw, solid nut screw, or inverted roller screw design with internal threads on the hollow core rotor 150, and screw shaft 170 can be rotationally fixed or stationary, depending on the configuration of rotor 150 and nut 160.

The main bearing assembly 180 can be disposed inside the central portion 125 of the integrated housing 120, or provided within a separate main bearing housing 182; e.g., coupled between the central housing 125 and control housing 192 toward the proximal end 102 of housing 120 as shown in FIG. 1. One or more additional bearings 185 can also be provided, for example an internal, secondary bearing 185 configured to support rotor 150 inside central housing 125 toward the distal (front) end 104.

A rotary encoder or similar feedback device 190 can be provided in the proximal (back) end 102 of the housing 120, and operationally engaged with the rotor 150 via a rotor hub 152 or extension 175 of the screw shaft 170. The feedback device 190 is configured to sense the rotational position of the rotor 150, in order to time the rotor magnets to the stator phases according to the drive current provided to stator stacks 135. The feedback device 190 can also be used to determine the position of the thrust tube along axis A, based on the rotor position.

One or more external control connectors 195 can also be provided; e.g., for power and control communications with the feedback device 190 and other components of actuator system 100. Depending on application, the feedback device 190 and connectors 195 can be provided with a separate encoder/controller housing 192 that is coupled to a main rotor bearing housing 182, as shown in FIG. 1, or the central housing 125 can be extended to accommodate these components. Other suitable actuator configurations are described in U.S. Pat. No. 7,939,979 B2 to Hochhalter et al., U.S. Pat. No. 8,196,484 B2 to Holker et al., U.S. Pat. No. 8,978,497 B2 to Bourgoine et al., and U.S. Patent Publication No. 2014/0311261 A1 to Rosengren et al., each of which is incorporated by reference herein, in the entirety and for all purposes.

SPM-TFM Motor Technology

As shown in FIG. 1, motor 110 is configured as a surface permanent magnet transverse flux motor (SPM-TFM). In this configuration, stator 130 is formed as a series of one or more stator assemblies or stacks 135, for example two three-phase stator stacks 135 coupled to the inner surface 126 of central housing 125. The stator assemblies 135 are configured to generate magnetic flux when current is applied to the windings, and the flux is directed in a transverse sense to interact with surface permanent magnet (SPM) elements 155 on rotor 150, driving rotor 150 into rotation about the longitudinal axis A.

The flux path can be oriented transverse to the direction of rotation; that is, transverse or substantially perpendicular to the motion of the rotor surface. The resulting electromotive force (emf) is perpendicular to the magnetic field crossing the air gap between stator stacks 135 and rotor magnets 155, creating motor torque. The field direction can be alternated by reversing the current in the stator stacks, in order to drive rotor 150 either clockwise or counterclockwise about axis A, at a selected speed determined by the switching current, or using a pulse width modulated voltage or current supply. This transverse flux configuration has substantial design advantages over traditional radial-flux motor designs, as described with respect to the particular applications and embodiments below.

The thrust tube 140 may include an elongated, outer hollow tubular portion, which extends between its proximal and distal ends 142, 144. The tubular portion may have a hollow interior to receive and accommodate the threaded screw shaft 170. In some embodiments, the exterior of the tube 140 can be provided with a pair of diametrically opposed anti-rotation flat portions 145, as described in U.S. Pat. No. 7,541,707 B2, and engage corresponding inner flat surfaces 147 in the distal housing end 104 to prevent the thrust tube 140, and thus the nut 160, from rotating. In other embodiments, the flat portions 145 may comprise a hexagonal exterior configuration, or other suitable geometrical configuration, instead of diametrically opposed portions.

In other embodiments, however, the actuators described herein may include alternative or additional anti-rotation mechanisms, such as the anti-rotation mechanism illustrated in FIGS. 1-4 of U.S. Pat. No. 8,978,497 B2, incorporated by reference herein. Generally, an anti-rotation mechanism may prohibit the rotation of the thrust tube 140 such that tooling may be attached directly to the actuator, such as via the workpiece connection member or fitting 146, without the need for any external guide member to prohibit rotation of the thrust tube.

Figure 2:
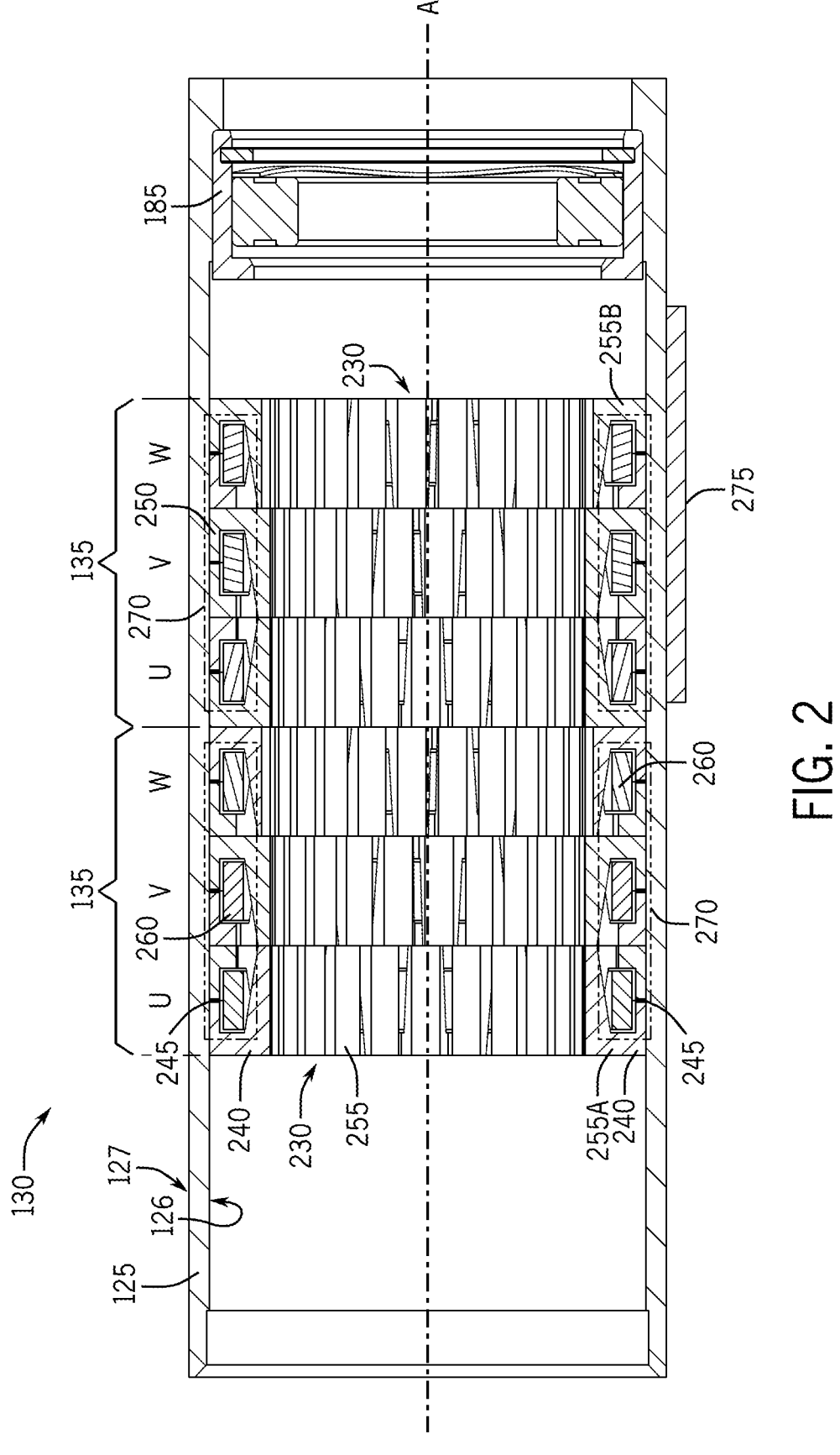
FIG. 2 is a section view of a stator assembly for the linear actuator system of FIG. 1.

FIG. 2 is a section view of a stator 130 for a transverse flux motor; e.g., for use in an integrated motor linear actuator system 100 according to FIG. 1, or as otherwise described herein. In this particular example, stator 130 includes two axially distributed stator assemblies or stacks 135, each including three individual stator stages 230, arranged into three sequential phases U, V, and W.

Each stator stage 230 includes an insulated U-shaped stator core 240 with a bobbin winding or annular coil 260, disposed about the common longitudinal axis A. Stator cores 240 are formed with an annular body portion 250 extending circumferentially about axis A, radially outward of winding 260 at the outer diameter of the stator core 240, and insulated from one another with an insulating material 245; for example a non-conducting, non-magnetic material, or an insulating material with other selected (e.g., non-ferromagnetic) properties. A series of rectangular or trapezoidal stator teeth 255 are arranged in alternating pairs 255A, 255B, each extending from a respective side or axial portion of the stator core 240; e.g. on the left and right respectively, as shown in FIG. 2. The individual teeth 255A, 255B extend radially toward the inner diameter of the respective stator core 240, on either side of the winding 260, and axially along longitudinal axis A, radially inward of winding 260 at the inner diameter of the stator core 240, adjacent the rotor magnets.

Windings 260 can be formed of a suitable conductive material such as copper, and energized in order to generate magnetic flux. Stator cores 240 can be made of a soft magnetic material, for example a polymer-based or composite material with soft magnetic properties selected for guiding the flux generated by windings 260 in a transverse sense, while reducing the overall size and weight of the stator stages 230 and assemblies 135. Alternatively, a soft iron material can be used for stator cores 240, or another material with suitable magnetic properties.

The flux path starts in from a tooth 255A extending from one side of the U-shaped core 240 (e.g., on the left in FIG. 2), propagates vertically (or radially) to the outer diameter, then traverses across the outer diameter to an adjacent tooth 255B extending from the other (right) side of the core 240, and back radially through the air gap to the adjacent rotor magnet. When current is applied to the winding 260, the resulting electromotive force (emf) is perpendicular to the magnetic field lines crossing the air gap, which creates motor torque on the rotor. The field direction can be alternated by reversing the current in the coil or windings 260, in order to drive the rotor in a transverse sense; that is with the field direction perpendicular to the direction in which the surface of the rotor moves as it rotates past the alternating stator teeth 255A, 255B.

As shown in FIG. 2, three stator stages 230 are axially distributed in each stator assembly 135, with stator cores 240 attached to housing 120 along the inner surface 126 of the central portion 125. In this particular example, twenty-four stator teeth 255 are provided in each stator stage 230, distributed circumferentially about each stator core 240 in twelve sets of alternating pairs 255A, 255B. The winding 260 extends circumferentially about axis A, e.g., in a bobbin winding or annular coil configuration within the body of stator core 240, radially inward of the annular body portion 250, adjacent to and radially outward of the stator teeth 255.

The teeth 255 in successive stator cores 240 can be rotated or clocked by a selected angle about longitudinal axis A; e.g., at an electrical angle of 120° (electrical degrees), defining three different phases U, V and W for each successive stator stage 230, arranged sequentially along axis A in each stator assembly 135. The windings 260 in each stator stage 230 are energized according to the respective phases U, V, W, generating magnetic flux that is guided by stator core 240 and stator teeth 255 in a transverse sense to drive the rotor into rotation about axis A, as described above.

The polymer-based or composite material of stator cores 240 can selected both for magnetic properties and for reduced overall component size and weight, as well as for ease of manufacturing and reduced cost. The bobbin winding (or annular coil) 260 is formed of a conducting material such as copper, selected to generate magnetic flux with reduced losses when energized by an electric current. The stator core 240 and stator teeth 255 are configured to guide the magnetic flux generated by windings 260, so that the alternating stator teeth 255A, 255B form alternating pairs of magnetic poles. The pole directions can be revised by reversing the current in the winding 260, driving rotor 150 in a clockwise or counter clockwise direction about axis A, at a selected rotational speed.

A number of circumferentially distributed heat pipes or similar closed-circuit, convective circulation features 270 can also be provided, in order to passively dissipate heat from the winding 260. In this particular example, each stator assembly or stack 135 is provided with one or more heat pipes 270 that are circumferentially distributed about the stator stages 230, extending axially through each the stator cores 240 adjacent to the windings 260, and radially outward to the inner surface 126 of the central housing 125. Alternatively, individual sets of heat pipes 270 can be provided for each stator stage 230 and stator core 240, or a single set of heat pipes 270 can be provided for the stator 130 as a whole, extending axially through the adjacent stator stages 230 in each stack 135.

The heat pipes 270 are adapted to circulate a thermally conducting fluid, based on the temperature differential between the stator cores 240 and central housing 125. The inner surface of the central housing 125 can be milled to accommodate the heat pipes 270, or provided with internal channels for fluid circulation. Additional passive cooling structures can also be provided, for example one or more heat sinks 275 adapted for improved radiative and convective heat dissipation from the outer surface 127 of central housing 125.

In some designs, the stator stages 230 provide a combination of passive conductive, convective, and/or radiative cooling, with or without heat pipes 270, sufficient to maintain the operational temperature of the actuator system within a suitable or desired range without additional active cooling systems. In other designs, convective circulation systems 270 can take the form of an active or open-loop cooling fluid system, and other active, external cooling systems such forced airflow can also be used to increase the rate of heat dissipation, reducing the operating temperature as required.

SPM-TFM Motor Components

In the particular example of FIG. 2, stator 130 includes two three-phase stator assemblies 135, each having three individual stator stages 230 with phases U, V and W. The stages can be wired in parallel or series. The stator teeth 255 in each successive stage 230 are rotated or "clocked" about the longitudinal axis A, for example at an electrical angle of 120° (electrical degrees), providing each stator assembly 135 with the three respective phases. The windings 260 in each successive stator stage 230 are energized according to the respective phases, along transverse flux paths configured to drive the rotor into rotation about longitudinal axis A.

The drive voltage applied to the three-phase stator assemblies 135 can vary depending on the desired speed, for example 150 V, 230 V, or 460 V, or other suitable value. The power input can be provided as a three-phase input, or depending on stage configuration and coil wiring, adapting the number and configuration of the stator cores 240, stator teeth 255, and stator windings 260 accordingly. The disposition of magnets on the rotor can also be adapted according to the design of stator stacks 135, and the number and position of the stator teeth 255 in each stator stage 230.

Surface permanent magnet (SPM) and transverse flux motor (TFM) technologies allow for a wide range of integrated motor actuators and actuator systems to benefit from improved power density and simplified motor manufacturing, including servo-weld and guided actuator systems for resistance spot welding and other manufacturing processes, as well as stainless steel, hygienic, and food-grade actuator systems for product handling and processing. SPM-TFM technologies are highly configurable, allowing integrated motor actuators to be customized with or without additional options such as internal, active or passive cooling, anti-rotation, and manual override systems.

TFM and SPM-TFM actuator systems can also provide the advantages of being relatively lighter in weight than traditional (e.g., radial flux) motor designs, due to the significantly less mass and volume of copper windings in the stator, providing for more compact and lighter stator stages 230. These actuator systems can also utilize advanced, polymer-based soft magnetic composite materials for the stator core 240, resulting in lower overall component weight and cost.

For a given size and weight envelope, TFM and SPM-TFM technologies have the ability to substantially improve power density, e.g., by a factor of up to three or more times as compared to existing technologies, including but not limited to radial flux surface permanent magnet (SPM-RF) motors currently utilized in other actuator products. These extra performance advantages allow more advanced actuator systems to perform the same amount of work as other designs with less thermal losses, reducing the need for extra complexities such as external cooling components.

TFM and SPM-TFM motor technologies provide for actuator systems that are smaller and lighter in weight, as compared to radial flux systems and other traditional designs. For example, a TFM or SPM-TFM actuator system could provide a given torque output within the same overall length envelope as a traditional system SPM-RF system, but with reduced motor diameter, or within a reduced length envelope, keeping the motor diameter the same. The system weight can also be reduced by using less copper in winding 260, and less or lighter magnetic material in the stator body 240, while reducing or minimizing the need for active, external cooling due to reduced losses, as described above.

Another benefit of TFM and SPM-TFM technology is ease of manufacturing. With U-shaped stator cores 240 made of polymer-based soft magnetic composite materials and a simpler, bobbin-type winding or annular coil arrangement, the SPM-TFM manufacturing process allows for each component of the motor to be manufactured modularly and at relatively lower cost, as compared to other traditional motor designs. SPM-TFM motor technologies also allow for a modular, multi-stack three-phase stator 130, with one or more stator assemblies 135 configured from a series of substantially identical, parallel or series wound stator stages 230, clocked to provide the three phases (U/V/W), for example with all the common phases terminated together (e.g., using a Wye termination, or an alternate delta wiring connection).

While some TFM and SPM-TFM motor systems may be driven at lower speeds than traditional radial flux (RF) motor designs, e.g., based on servo drive limitations, this is not necessarily a limiting factor. Linear actuator systems can also be operated at higher motor drive speeds by selecting the pole count (number of teeth) in the stator stages, and the corresponding number and arrangement of magnets on the rotor, and using a suitably fast drive system; e.g., with faster switching frequencies adapted for the desired motor speeds, and according to the corresponding fundamental motor frequencies, depending on the stator tooth and magnet arrangement.

SPM-TFM manufacturing techniques thus allow for many other different motor configurations (with higher or low operating voltages and rated torque) to be adapted for different application needs, including welding and manufacturing, materials processing, component handling, and in the more general industrial automation industry.

Actuator System Components

Figure 3:
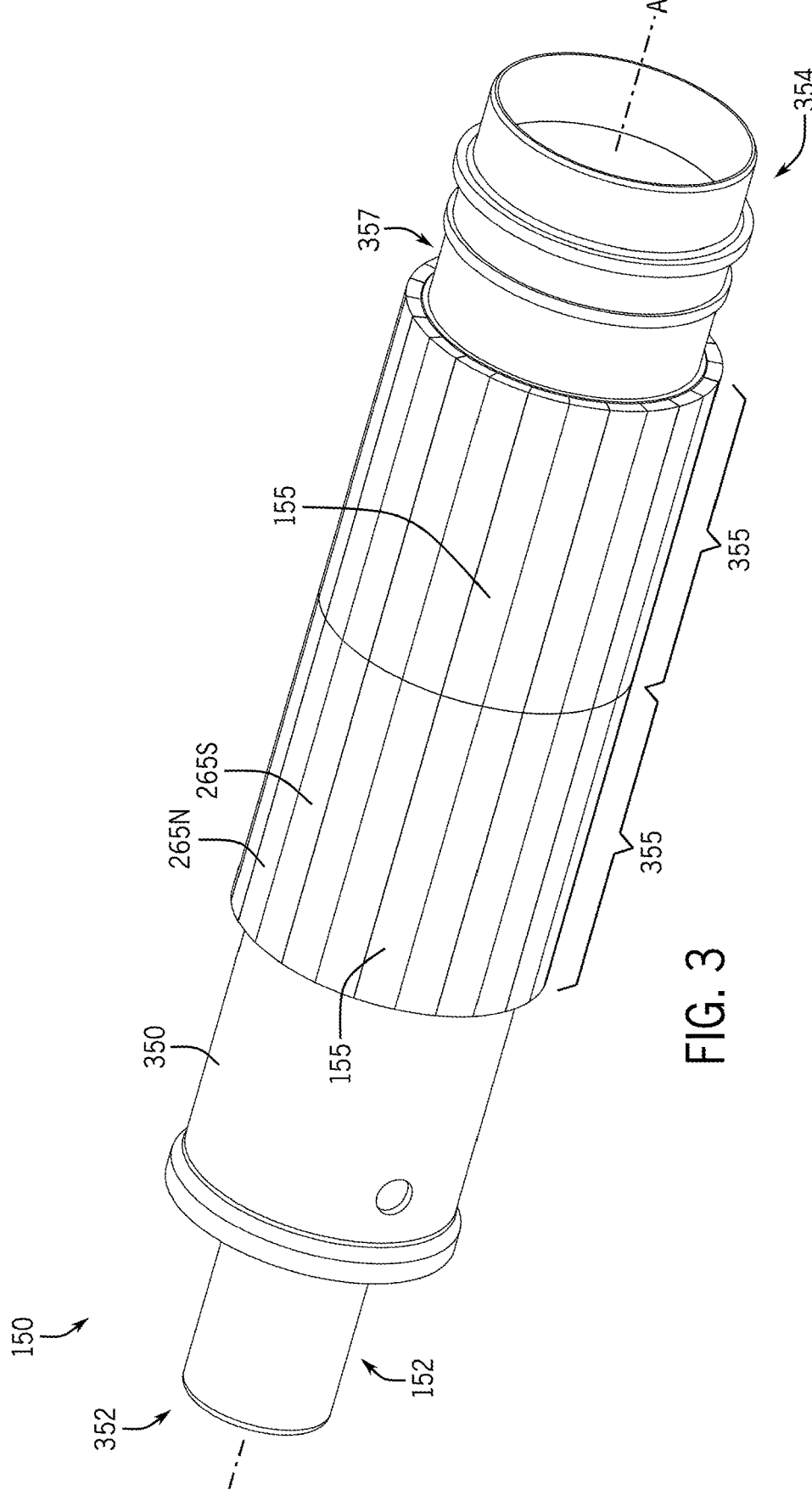
FIG. 3 is an isometric view of a hollow core rotor for the linear actuator system of FIG. 1.

FIG. 3 is an isometric view of a hollow core rotor 150 for a linear actuator system; e.g., for use in an integrated motor SPM-TFM linear actuator system 100 according to FIGS. 1 and 2, or as otherwise described herein. In this particular example, rotor 150 includes a hollow core rotor body 350 extending longitudinally about rotational axis A, from a first (proximal) end 352 to a second (distal) end 354. One or more bearing surfaces can be provided to interface with the primary (main) or secondary bearing assemblies, for example on the rotor hub 152, at the proximal end 352 of the rotor 150, and at the distal end 354.

A number of individual surface-mount magnets 155 are disposed about the circumference of rotor body 350, extend longitudinally along axis A to define an alternating arrangement of north (N) and south (S) magnetic poles 265N, 265S. In the radial multipole, ring magnet arrangement of FIG. 3, for example, one or more assemblies 355 of surface permanent magnet (SPM) elements 155 are distributed about the circumference of the body of rotor 150, disposed end-to-end in the axial direction and alternating in the circumferential direction to define the magnetic poles 265N, 265S. In this particular example, two axially arranged radial multiple ring magnet assemblies 355 are provided, each with a number of alternating poles 265N, 265S selected to match the number of alternating stator teeth in the corresponding stator stages. In other examples, one, two, three or more magnet assemblies 355 can be provided, according to the number and arrangement of the stator.

As shown in FIG. 3, the alternating poles 265N, 265S formed by magnets 155 extend substantially continuously in the axial and circumferential directions, covering the outer surface 357 of rotor body 350 along the axial extent of the stator (see FIG. 1). Alternatively, any suitable number and arrangement of magnetic poles 265N, 265S can be distributed about the circumference of rotor body 350, in either a spaced or substantially continuous arrangement. The number and arrangement of the individual magnets 155 and multipole assemblies 355 can also vary, as disposed in the axial direction along the outer surface 357.

For example, poles 265N, 265S can also be formed by disposing magnets 155 on the interior of the rotor body 350; that is, either proximate or adjacent to (but not necessarily at) the outer surface 357. A combination of permanent magnets 155, coils, electromagnets, and/or ferromagnetic components can also be used to define the magnetic poles 265N, 265S, depending on rotor design. It is also possible to clock or rotate the circumferential arrangement of the magnet assemblies 355 about the longitudinal axis A, with individual magnets 155 defining the arrangement of magnetic poles 265N, 265S according to the corresponding configuration of the stator teeth in each respective stator stage.

Figure 4B:
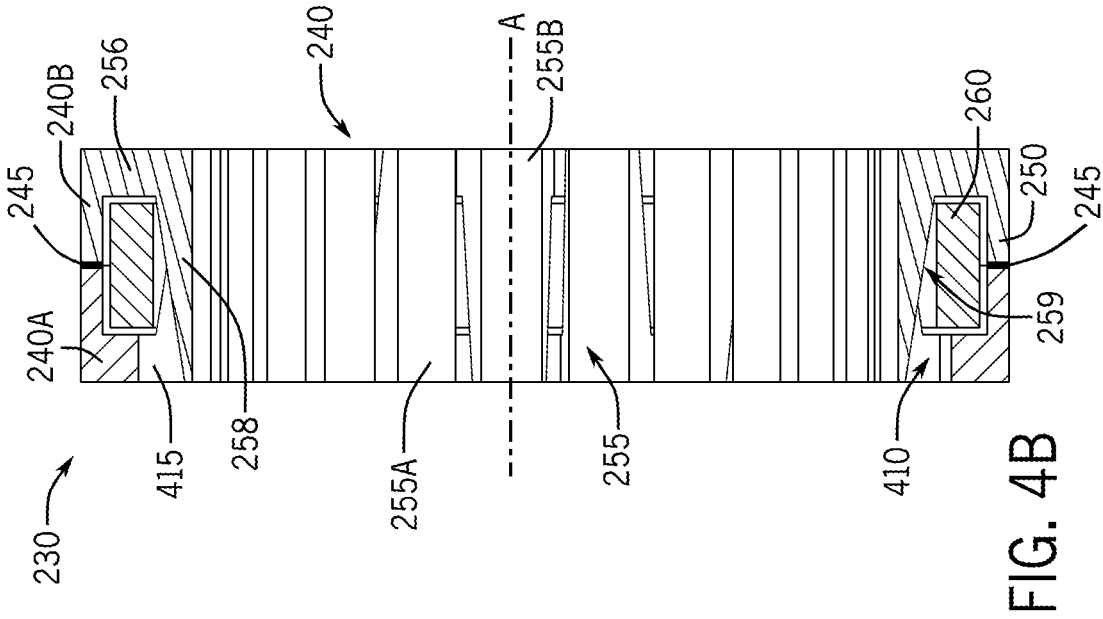
FIG. 4B is a section view of the stator stage in FIG. 4A.
Figure 4A:
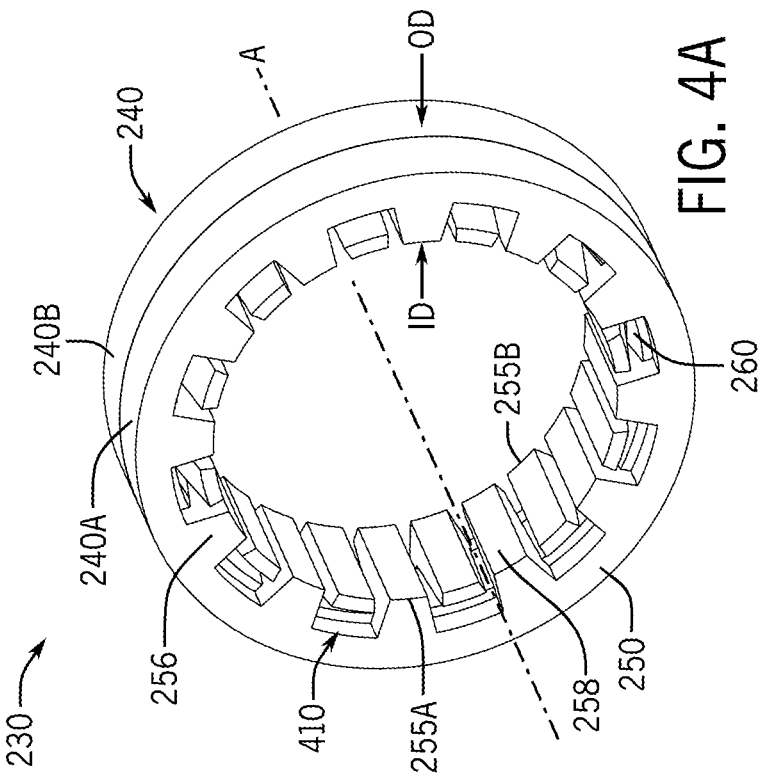
FIG. 4A is an isometric view of a stator stage for the stator assembly of FIG. 3.

FIG. 4A is an isometric view of a stator stage 230 for a transverse flux motor; e.g., for use in a stator 130 or stator subassembly 135 as shown in FIG. 2, or as otherwise described herein. FIG. 4B is a section view of the stator stage 230, taken along longitudinal axis A.

In the particular examples of FIGS. 4A and 4B, stator stage 230 includes a stator core 240 formed of an annular body portion 250 extending radially inward from the outer diameter (OD) of stator core 240 to two sets of alternating sets of stator teeth 255A, 255B, distributed circumferentially about the inner diameter (ID). Stator cores 240 are insulated from one another with an insulating material 245. A bobbin winding or annular coil 260 extends circumferentially within the stator core 240, oriented perpendicular to longitudinal axis A, and disposed radially between the stator teeth 255 and annular body portion 250.

The stator teeth 255 are arranged in alternating pairs 255A, 255B, for example with a rectangular or trapezoidal shape, and distributed circumferentially about the inner diameter ID of stator core 240. For example, the stator core 240 can be formed in two axially engaged annular portions or halves 240A, 240B, with one set of alternating stator teeth 255A extending radially inward and axially forward from the first half 240A of stator core 240 (on the left-hand side of FIG. 4A), and another set of alternating stator teeth 255B extending radially inward and axially backward from the second half 240B of stator core (on the right hand side), opposite the first set of alternating teeth 255A. The two halves 240A, 240B of stator core 240 can be separately formed, and then axially coupled about the winding 260. Winding 260 is "sandwiched" or secured between the two halves 240A, 240B of stator core 204, extending circumferentially between the alternating sets of teeth 255A, 255B, and the annular body 250 formed by joining the two halves 240A, 240B at the outer diameter OD.

The annular body portion 250 defines the bottom of the U-shaped stator core 240. The legs are formed by the radial portions 256 of the stator teeth 255A, 255B, extending radially inward (perpendicular to axis A) from annular body 250, on either side of the winding 260. The axial tooth portion 258 extends axially (parallel to or along longitudinal axis A), from the respective leg portion 256 to an open end defined by a radial gap 410, opposite the leg portion 256 on the opposite side of the winding 260.

The axial tooth portion 258 can be provided with a beveled, straight or curved inner surface 259 adapted to engage the inner diameter of the winding 260, securing winding 260 between the annular portion (or halves) 240A, 240B of the stator core 240. In this configuration, winding 260 is disposed perpendicular to the longitudinal axis A, extending circumferentially about axis A between the annular body 250 and the alternating sets of stator teeth 255A, 255B. In the radial sense, winding 260 is disposed between the circumferentially extending annular body 250, at the outer diameter OD of stator core 240, and the axial portions 258 of the alternating stator teeth 255A, 255B, which face the rotor magnets at the radially inner diameter ID.

In this bobbin winding or annular coil design, there are no end turns on winding 260, substantially reducing losses and improving thermal transfer from the copper conductor to the stator core 240 and surrounding housing. An epoxy potting compound or composite fill material 415 can be provided to fill the radial gap 410 at the open end of the stator teeth, or in other areas between the winding 260 and annular body 350 or stator teeth 255A, 255B, with thermal properties selected to improve heat transfer from the copper coils or laminations through the stator core 240 to the housing. The fill material 415 can also be selected for both thermal and structural properties, in order to provide additional strength and stability to stator core 240.

As shown in FIGS. 4A and 4B, there are twenty-four individual stator teeth, arranged in twelve alternating, axially extending pairs 255A, 255B. The number and configuration of the stator teeth 255A, 255B varies depending on embodiment, for example ranging up to thirty-six or more stator teeth, arranged in up to eighteen or more pairs 255A, 255B, or down to sixteen or fewer stator teeth, arranged in eight or fewer pairs 255A, 255B.

Each of the stator teeth 255A, 255B defines a magnetic pole, corresponding to the matching number of alternating rotor poles on the rotor body (see FIG. 3). The annular, modular configuration of stator core 240 allows for a substantially higher number of mating stator poles to be designed into the motor system, without reducing the cross-sectional area of the copper conductor in the winding 260. This maintains the capability of the winding 260 to carry current and generate transverse flux, substantially independent of the number of teeth or poles, for a given inner core diameter ID. The diameter and axial length of the stator core 240 can also vary depending on the number and size of stator teeth 255A, 255B, the cross-sectional area of the winding 260, and the rotor arrangement.

Figure 5A:
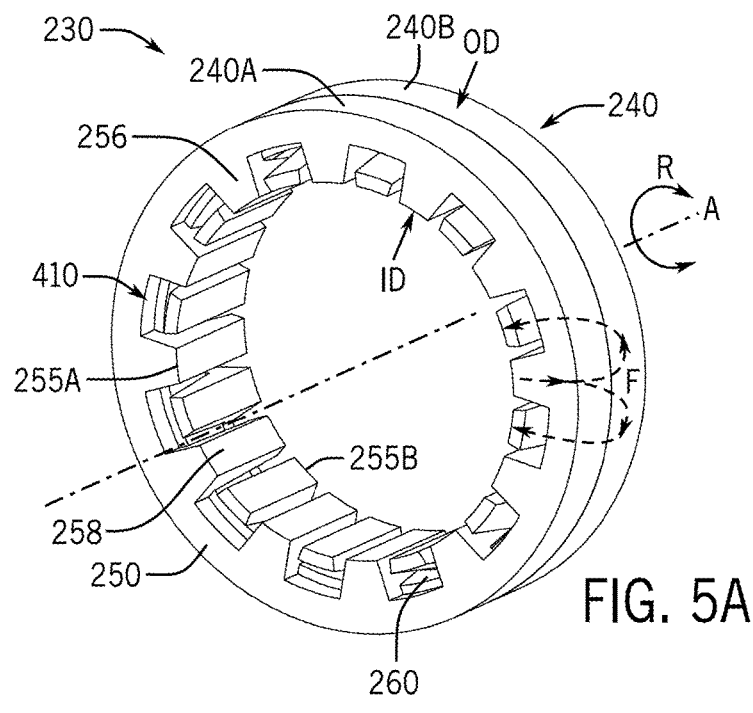
FIG. 5A is an isometric view of the stator stage in FIGS. 4A and 4B, illustrating a transverse flux path through the stator core.
Figure 5B:
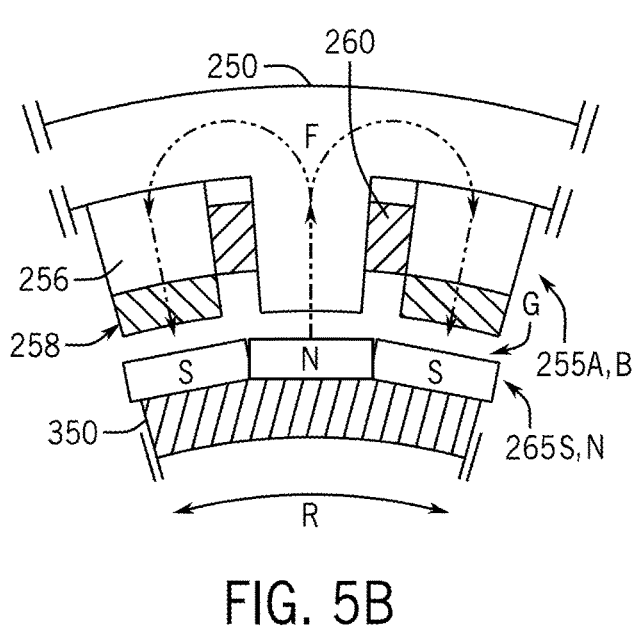
FIG. 5B is a detail view of the stator core, showing the stator teeth adjacent the rotor poles.
Figure 5C:
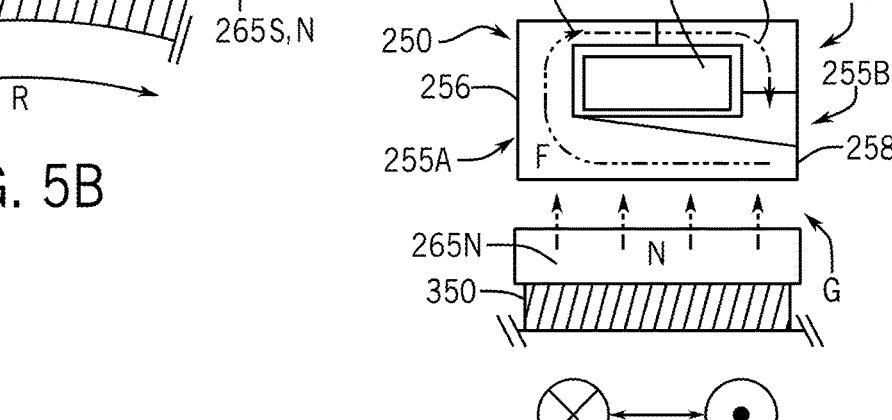
FIG. 5C is a section view of the stator core in FIG. 5B, showing one rotor pole.

FIG. 5A is an isometric view of stator stage 230, illustrating the transverse flux path F through stator core 240. FIG. 5B is a detail view of the stator core 240, showing stator teeth 255A, 255B disposed adjacent the corresponding magnetic poles 265N, 265S on rotor body 350. FIG. 5C is a section view of the stator core 240, with one rotor pole 265N.

The leg portions 256 of adjacent stator teeth 255A, 255B extend along opposite sides of the winding 260, as defined by the respective axial portions or halves 240A, 240B of the stator body 240. The axial portions 258 are also opposed, extending from left to right along teeth 255A, and from right to left along teeth 255B, with opposite open ends as defined by the respective radial gaps 410.

When current is applied to the winding 260, the adjacent stator teeth 255A, 255B form alternating pole pairs, each defining a transverse flux path F for magnetic coupling with the corresponding magnetic poles 265N, 265S on rotor body 350. The flux path F is oriented transverse to the rotational motion of the rotor body 150; that is, primarily or substantially in the radial and axial directions, which define a plane perpendicular (orthogonal) to the circumferential direction of the rotor's rotational motion R, as shown in FIG. 5C. This contrasts with a radial flux motor configuration, where the flux path is primarily in the radial and circumferential directions, and oriented substantially perpendicular to axis A.

The resulting electromotive force (emf) is oriented perpendicular to the magnetic field lines crossing the air gap G, generating torque on the rotor body 350. The torque can have either a clockwise or counterclockwise sense about longitudinal axis A, as shown in FIG. 5A, depending on the coil current and pole orientations. The torque drives rotor body 150 in rotational motion, either to the left or right as shown in FIG. 5B, and either out of or into the page as shown in FIG. 5C. The coil current can be pulse-width modulated to generate a particular speed and rotational frequency, as defined by the passage of the rotor poles 265N, 265S along the outer surface of rotor body 150.

The flux path F traverses air gap G in a radial direction; e.g., crossing to stator tooth 155A from a complementary (e.g., north) pole 265N of an alternating pole pair 265N, 265S, as defined by the adjacent rotor magnets 155. The flux propagates axially (or longitudinally) along the axial tooth portion 258 and radially outward along leg portion 256 toward the outer diameter of annular body 250, on the first half 240A of the stator core 240. This is the portion of the core 240 from which tooth 255A extends, on the first (left-hand) side of winding 260.

The flux traverses annular body 250 in an axial sense, from the first half 240A of stator core 240 to the second half 240B, and circumferentially to the adjacent stator teeth 255B, extending on the opposite (right-hand) side of winding 260 from teeth 255A. The flux then propagates radially inward along the respective leg portions 256, axially or longitudinally along the axial portions 258, and then radially outward back across the air gap G to a complementary pole 265S on rotor body 350.

While the flux path F may have both axial and circumferential components in the annular body 250, where the flux propagates between adjacent teeth 155A, 155B, the path F is substantially radial in the leg portions 156, and substantially axial inside the axial portion 158, before exiting radially through the air gap G to the adjacent rotor poles 165N, 165S. As shown in FIG. 5C, therefore, the flux path F is oriented substantially in the radial and axial plane, aligned along the longitudinal axis A, and transverse to the rotational motion of the rotor body 150.

Figure 6:
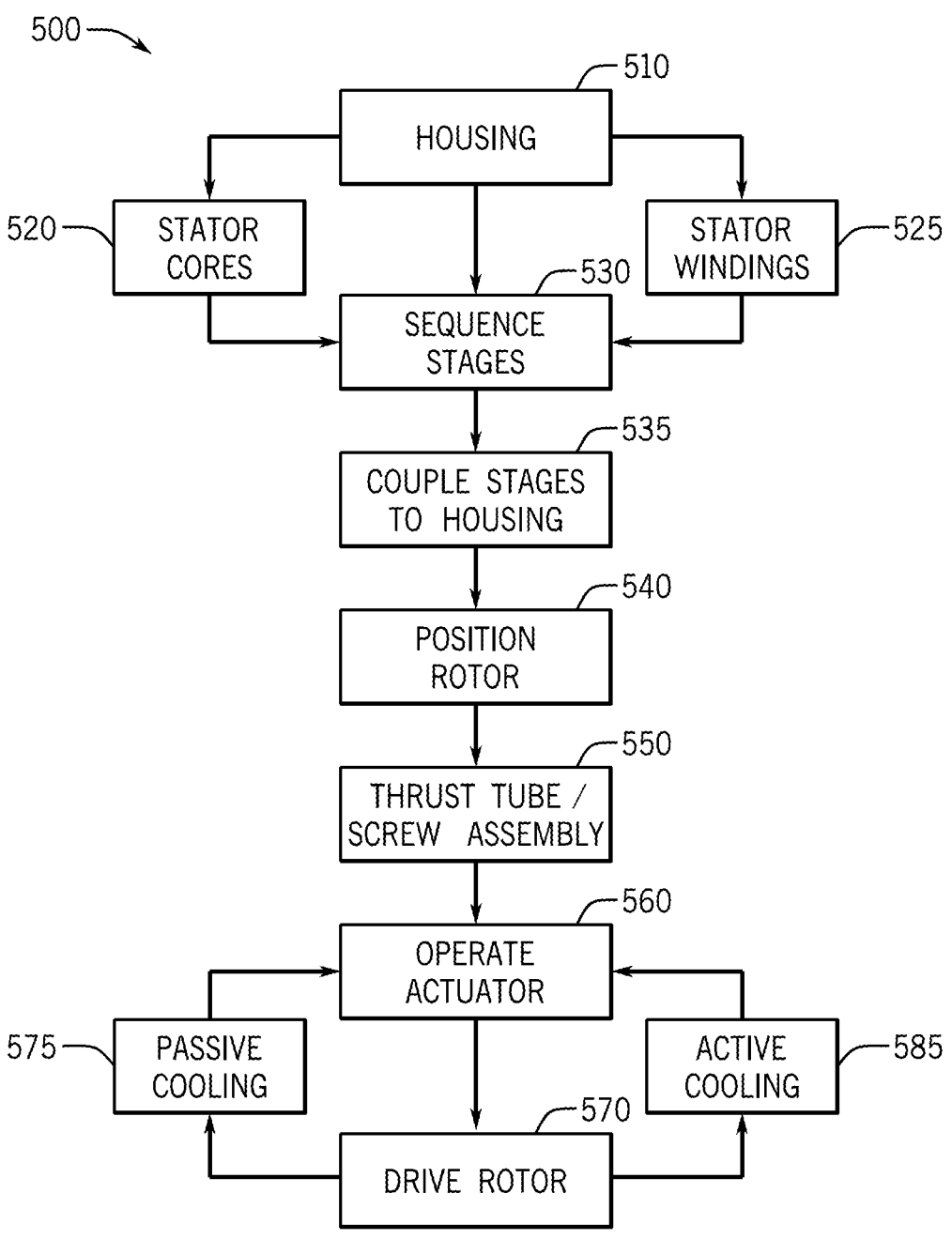
FIG. 6 is a block diagram illustrating a method for manufacturing and operating the linear actuator system.

FIG. 6 is a block diagram illustrating a method 500 for manufacturing a linear actuator system, for example an integrated motor actuator system 100 with a surface permanent magnet transverse flux motor 110, as described herein. As shown in FIG. 6, method 500 can include one or more steps of providing an integrated motor actuator housing (step 510), providing one or more stator cores (step 520) with windings (step 525), sequencing the stator cores and windings to define the stator stages (step 530), coupling the stator stages to the housing (step 535), positioning a rotor inside the stator stages (step 540), and coupling a thrust tube and screw assembly to the rotor (step 550).

These steps can be performed in any order or combination, with or without additional operational steps and processes, and as described herein. For example, method 500 may also or alternatively include one or more steps of operating the actuator system (step 560), where the stator core is configured to guide magnetic flux to drive the rotor (step 570). Passive cooling (step 575) or active cooling (step 585) can be provided, or a combination, in order to maintain the temperature of the actuator system within selected operational limits.

As defined herein, providing the housing (step 510) means providing or obtaining the housing for use in method 500, for example by manufacturing the housing, procuring the housing, ordering the housing from stock, or buying the housing from a vendor. The housing can be formed of aluminum or a suitable metal alloy such as steel, or from other durable materials, with a main body portion having inner and outer surfaces and one or more end caps or bearing and controller housings, as described herein.

One or more stator cores can be formed (step 520) of a polymer-based or composite material with magnetic properties selected for guiding magnetic flux generated by the windings. In some embodiments, the stator core is formed by engaging two separate annular body portions forming axial halves of the stator core, each with an alternating set of the stator teeth. The winding is engaged between the alternating sets of stator teeth.

Each of the stator teeth can include a radial leg portion, extending inward from an annular body formed at the outer diameter of the stator core, and an axial portion extending from the leg portion along the longitudinal axis, adjacent the rotor. A radial gap can be defined at an open end of the axial portion, opposite the leg, between the open end and the annular body. The magnetic flux is guided to the axial portion of the stator teeth and across the air gap to the adjacent poles on the rotor, generating an electromotive force (emf) to drive the rotor body in rotation about the actuator axis.

In some embodiments, the windings can be potted (step 525) with a nonmagnetic fill material or potting compound, selectively filling the radial gap and any spaces between the winding and the stator teeth or stator core. The fill material can be selected for thermal properties to improve heat transfer from the winding and stator core to the motor housing, and with structural properties to provide additional stability.

A plurality of stator stages can be formed of the stator cores and windings, and provided in sequential order (step 530). For example, the stator teeth in each stage can be clocked about the longitudinal axis; e.g. at an electrical angle of 120° (electrical degrees), in order to define three different phases for the respective stators (or at a functionally equivalent geometric angle, yielding the desired phase relationship). The magnetic poles on the rotor extend axially along a set of the sequentially ordered stator stages, according to the sequential order in which the three phases are arranged. The power input can be provided as a three-phase input, depending on the stator stage wiring. A single-phase motor or other multi-phase arrangement can also be used, with the number of arrangement of the stator teeth and rotor poles adapted accordingly.

Coupling one or more stator stages to the housing (step 535) comprises coupling the stator stages to the inner surface of the housing, opposite the outer surface. Each of the stator stages includes a winding and a stator core, with a plurality of stator teeth circumferentially distributed about the longitudinal axis, at an inner diameter of the stator core. The winding in each stage defines a ring or annulus oriented substantially perpendicular to the longitudinal axis, extending circumferentially about the stator core between the stator teeth and the outer diameter.

Positioning the rotor (step 540) comprises disposing the rotor coaxially within the stator stages, within the inner diameter of the stator cores. The rotor has a plurality of magnetic poles disposed along an outer surface, adjacent the stator teeth an air gap. The rotor poles can be defined by permanent magnets or other magnetic elements coupled to the outer surface of the rotor body, for example using surface-mount permanent magnet (SPM) elements.

Coupling a thrust tube and screw assembly to the rotor (step 550) comprises operationally coupling the screw assembly to the rotor, and coupling the thrust tube to the screw assembly. The screw assembly can be adapted to convert rotational motion of the rotor (that is, about the longitudinal axis) into linear motion of the thrust tube (along the longitudinal axis). For example, the screw assembly can include a roller nut coupled to the thrust tube, and configured to engage with a threaded screw shaft that is rotationally coupled to the rotor. Alternatively an ACME thread, ball screw, solid nut screw, or inverted roller screw design can be used, and the screw shaft can be rotationally fixed, with the nut coupled to the rotor.

In operation of the actuator system (step 560), the stator core is configured to guide magnetic flux generated by the winding to drive the rotor, so that the flux path is oriented transverse to the direction of rotation. The nut engages the threaded screw shaft, converting the rotational motion of the rotor to drive the thrust tube into linear motion along the common axis (step 570).

One or both of passive cooling (step 575) and active cooling (step 585) can be provided. Passive cooling (step 575) includes a combination of conductive, convective and radiative cooling techniques, for example using a fill material to improve conductive heat transfer from the winding through the stator core to the housing, and providing a heat pipe to convectively transport heat from the windings and stator core to the housing. A heat sink can also be coupled to the outer surface of the housing to provide additional radiative and convective cooling, increasing the temperature differential between the housing and stator core, and improving the conductive and convective heat transfer.

In some designs, these and other passive conductive, convective and radiative cooling techniques can be sufficient to maintain the operational temperature of the actuator system within a desired or suitable range, without active water or fluid-based cooling systems. Alternatively, a combination of passive cooling (step 575) and active cooling (step 585) can be employed, for example by replacing the convective heat pipe with an active cooling loop, or using an external fan or forced air system to increase heat transfer from the housing.

EXAMPLES

In various examples and embodiments, an integrated motor linear actuator system includes a housing, with one or more stator stages coupled to the inner surface. Each of the stator stages has a winding and a stator core, with a plurality of stator teeth circumferentially distributed about a longitudinal axis of the housing, at an inner diameter of the stator core. A rotor is disposed about the longitudinal axis, inside the stator core, with a plurality of magnetic poles circumferentially distributed along an outer surface of the rotor, adjacent the stator teeth.

A thrust tube and screw assembly can be operationally coupled to the rotor, with the screw assembly configured to convert rotational motion of the rotor about the longitudinal axis into linear motion of the thrust tube along the longitudinal axis. The winding can be configured to generate magnetic flux and the stator core can be configured to guide the magnetic flux to drive the rotor in rotational motion about the longitudinal axis, so that the magnetic flux guided by the stator core is oriented transverse to the direction of the rotational motion.

The magnetic flux can be guided along each of the stator teeth and across the air gap, oriented radially from the stator teeth to the adjacent magnetic poles on the rotor. Each of the stator teeth can comprise a leg portion extending radially inward from an annular body portion at an outer diameter of the respective stator core, to an axial portion extending adjacent the outer surface of the rotor, at the inner diameter of the stator core. For example, a radial gap can be defined at an open end of the axial portion of each stator tooth, opposite the leg portion, between the open end of the axial portion and the annular body portion of the respective stator core.

A nonmagnetic fill material or potting compound can be disposed between the winding and the stator core, in the radial gap, between the winding and the stator teeth, between the winding and the annular body portion of the stator core, or in any combination. The winding can define an annulus in each stator stage, oriented substantially perpendicular to the longitudinal axis, and extending about the respective stator core between the stator teeth and an outer diameter of the stator core.

The stator core can be formed of a polymer-based or composite material with magnetic properties selected for guiding the magnetic flux generated by the windings. The stator core can also be formed of two axially engaged halves or annular portions from which alternating sets of the stator teeth extend, so that the winding is engaged between the alternating sets of stator teeth and the annular body of the stator, which is formed by engaging the two annular portions or halves at the outer diameter of the stator core. The stator stages can also be configured to provide conductive or convective cooling of the windings and stator core, or a combination thereof, sufficient to maintain an operational temperature of the system without water cooling or other active flow-based cooling of the respective stator cores and windings. For example, a heat pipe system can be configured for convective flow of a thermally conductive fluid from one or more of the respective stator cores to the housing, and for dissipation from the housing by radiative transfer, airflow, or both.

The stator teeth can define adjacent, alternating pairs, with the axial portion of one tooth in each pair extending from a respective leg portion on a first side of the winding to an open end on a second side of the winding, opposite the first side. The axial portion of another tooth in each pair can extend from a respective leg portion on the second side of the winding to an open end on the first side of the winding, opposite the second side. The open ends can be defined by a radial gap spacing the open of the axial portion from the annular body portion of the stator core.

The adjacent pairs of stator teeth can be adapted to form a respective magnetic flux path oriented from a first of the magnetic poles on the rotor across an air gap to the axial portion of the one tooth in each pair. The path can extend along the respective leg portion of the one tooth toward an outer diameter of the stator core on the first side of the winding, and along the outer diameter of the stator core in an axial and circumferential direction to the leg portion of the other tooth on the second side of the winding, then along the leg portion of the other tooth to the respective axial portion, and from the axial portion across the air gap to a second magnetic pole on the rotor, adjacent the first.

The rotor can include a hollow core rotor body disposed coaxially about the screw assembly, with a plurality of permanent magnets defining the magnetic poles, for example using surface-mount permanent magnet components circumferentially distributed along the outer surface of the rotor, adjacent the stator teeth. The stator can include a plurality of sequentially ordered, substantially similar or identical stator stages, for example where the stator teeth in each sequentially ordered stage are clocked about the longitudinal axis by an electrical angle selected to define different phases. The electrical angle can be 120° (electrical degrees), defining a three-phase motor configuration, or a functionally equivalent geometric angle.

Each of the magnetic poles on the rotor can extend axially along a set of at least three of the sequentially ordered stator stages, having each of the three different phases, in sequential order. For example, surface-mount permanent magnets can be used, and distributed about the outer surface of the rotor to define the poles in an alternating N-S pattern, with the number of magnetic poles matching the number of adjacent stator teeth.

The screw assembly can include a roller nut coupled to the proximal end of the thrust tube, and a threaded screw shaft rotationally coupled to the rotor. The roller nut can be engaged with the threaded screw shaft to convert the rotational motion of the rotor to the linear motion of the screw shaft, for example so that the distal end of the thrust tube travels back and forth along the longitudinal axis, outside the actuator housing.

In any of these examples and embodiments, an integrated motor actuator includes one or more stator stages coupled to an inner surface of a housing, where each stator stage comprises a stator core and a winding. A rotor can be disposed about a longitudinal axis of the housing, inside the stator core, for example with a plurality of magnetic poles circumferentially distributed along an outer surface of the rotor, adjacent the stator core.

A thrust tube and screw assembly can be operationally coupled to the rotor, with the screw assembly configured to convert rotation of the rotor about the longitudinal axis into linear motion of the thrust tube, along the longitudinal axis. The stator core can be configured to guide magnetic flux generated by the windings in order to drive the rotor into rotation about the longitudinal axis, for example with the magnetic flux guided by the stator core oriented transverse to the direction of rotational motion.

The stator cores can comprise a plurality of stator teeth extending radially inward from an annular body portion of the stator core to an axial portion adjacent the rotor, and wherein the axial portions of the respective stator teeth extend across the winding to an open end defined by a gap spacing the open end of the respective axial portion from the annular body of the stator core.

The winding in each stator stage can be formed as a ring or annulus oriented substantially perpendicular to the longitudinal axis, extending about the respective stator core between the stator teeth and the annular body portion of the stator core. The stator core can be formed of a polymer-based or composite material with magnetic properties selected for guiding the magnetic flux generated by the windings, for example with reduced stator mass as compared to a substantially similar stator core formed of soft iron material.

The stator teeth can be arranged in adjacent, alternating pairs, with the axial portion of one tooth in each pair extending from a first side of the winding to the open end on a second side of the winding, opposite the first side. The axial portion of another tooth in each pair can extend from the second side of the winding to an open end on the first side of the winding, opposite the second side. The open ends can be defined by a radial gap spacing the open end from the annular body portion of the stator core.

The winding can define an annulus or bobbin shape oriented transverse to the longitudinal axis; e.g., where the pairs of stator teeth define alternating, adjacent magnetic poles responsive to current flow in the winding. The alternating, adjacent magnetic poles can be configured to form a flux path with alternating, adjacent pairs of the magnetic poles distributed along the outer surface of the rotor, adjacent the respective stator teeth across an air gap.

The stator can include a plurality of substantially identical stator stages disposed along the longitudinal axis in sequential order, for example where the stator stages are clocked about the longitudinal axis by a selected angle defining three different phases (e.g., at an electrical angle of 120°). The rotor can include a hollow core rotor body disposed coaxially about the screw assembly, with a plurality of permanent magnets circumferentially distributed along the outer surface to define the magnetic poles, for example using surface-mount permanent magnets extending axially along a set of the respective stator stages having the three different phases, in the sequential order.

A convective cooling fluid loop can be disposed in thermal contact with the winding and/or stator core, for example where the convective cooling fluid loop comprises a heat pipe structure configured to circulate cooling fluid to conduct heat from the winding and/or stator core to the housing. Any combination of active and passive cooling techniques can also be provided, for example using a potting or fill material to improve conduction of heat from the windings and stator core to the housing, or a heat sink or other radiative or convective technique to improve heat dissipation from the housing, increasing the temperature differential with respect to the stator core and windings. In any of these examples and embodiment, the active and/or passive cooling techniques can also be adapted to improve heat transfer from the motor and nut assembly, for example by radiative, conductive, or convective heat transfer from the motor and screw assembly through the stator cores to the housing, or any combination thereof.

A non-transitory, machine readable data storage medium can be provided with program code executable by a computer processor, in order to operate an actuator system or integrated motor actuator according to any combination of the examples and embodiments described herein.

In method embodiments, a housing can be provided with an inner surface opposite the outer surface. One or more stator stages are coupled to the inner surface of the housing, each having a winding and a stator core with a plurality of stator teeth circumferentially distributed about the longitudinal axis of the housing, at the inner diameter of the stator core. A rotor is disposed about the longitudinal axis, inside the stator core, with a plurality of magnetic poles circumferentially distributed along the outer surface, adjacent the stator teeth.

A thrust tube and screw assembly can be operationally coupled to the rotor, with the screw assembly adapted to convert rotational motion of the rotor about the longitudinal axis into linear motion of the thrust tube, along the longitudinal axis. The stator core can be configured to guide magnetic flux generated by the winding to drive the rotor, so that the magnetic flux guided by the stator core is oriented transverse to the direction of the rotational motion.

Each of the stator teeth can comprise a leg portion extending radially inward from an annular body portion of the stator core to an axial portion of the respective tooth, for example with the axial portion extending along the axis adjacent the rotor to an open end opposite the leg portion. A radial gap can be defined between the open end of the axial portion and the annular body portion of the stator core. The magnetic flux can be guided along the axial portions of the stator teeth, transverse to the rotational direction, and across an air gap to an adjacent pole on the rotor.

The radial gap and any spaces between the winding and the stator teeth or stator core can be filled or potted with a nonmagnetic fill material or potting compound, for example an epoxy or polymer material. The windings in each stator stage can define a ring or annulus, which is oriented substantially perpendicular to the longitudinal axis, and extending about the respective stator core between the stator teeth and the outer diameter.

The stator core can be formed of a polymer-based or composite material, for example with magnetic properties selected for guiding the magnetic flux generated by the windings. Two axial portions can be engaged to form the stator core, for example where an alternating set of the stator teeth extends from each axial portion. The winding can be engaged between the alternating sets of stator teeth and the annular body formed by engaging the axial portions at the outer diameter.

The stator stages can provide passive (e.g., conductive or convective) cooling of the stator cores and windings, or a combination thereof. The passive cooling can be sufficient to maintain an operational temperature of the actuator system absent water cooling or other active, forced-fluid flow cooling.

A plurality of stator stages can be coupled to the inner surface of the actuator housing, in sequential order. The stator teeth in each sequentially ordered stage can be clocked about the longitudinal axis, using a clocking angle (electrical angle) selected to define three different phases for the respective stage stages; e.g., at an electrical angle of 120° (electrical degrees). Each of the magnetic poles extends axially along a set of the sequentially ordered stator stages, having each of the three different phases.

The rotor can be formed with a hollow core rotor body, and roller nut can be coupled to the thrust tube, engaging with a threaded screw shaft rotationally coupled to the rotor, coaxially disposed within the hollow core rotor body. The rotor can be operated so that the roller nut engaged with the threaded screw shaft converts the rotational motion of the rotor to linear motion of thrust tube, for example with a distal end reciprocating along the longitudinal axis, outside the actuator housing.

A non-transitory, machine readable data storage medium can be provided with program code executable by a computer processor, in order to perform a method according to any combination of the examples and embodiments described herein. A system can be configured to operate according to any combination these examples and embodiment, and a method can be provided to operate any such system.

While this disclosure is made with reference to particular examples and embodiments, changes can be made and equivalents may be substituted without departing from scope of the invention as claimed. Modifications can also be made to adapt these teachings to different industries, materials, and technologies, not limited to the particular examples that are disclosed, and encompassing all embodiments falling within the language of the appended claims.

TABLE 1

| Figure References | |
| --- | --- |
| 100 | actuator system |
| 102 | proximal end |
| 104 | distal end |
| 110 | motor |
| 120 | integrated housing |
| 122 | back end cap |
| 124 | front end cap |
| 125 | central housing |
| 126 | inner housing surface |
| 127 | outer housing surface |
| 130 | stator |
| 135 | stator assembly/stack |
| 140 | thrust tube |
| 142 | first end of thrust tube |
| 144 | second end of thrust tube |
| 146 | thrust tube fitting |
| 148 | thrust tube port |
| 150 | rotor |
| 152 | rotor hub |
| 155 | rotor magnet |
| 160 | nut/nut ass'y |
| 165 | nut housing |
| 170 | screw shaft |
| 175 | shaft extension |
| 180 | main bearing |
| 182 | main bearing housing |
| 185 | secondary bearing |
| 190 | encoder/feedback device |
| 192 | control housing |
| 195 | control connector |
| 230 | stator stage |
| 240 | stator core |
| 240A/240B | core halves |
| 250 | annular body |
| 255 | stator teeth |
| 255A/255B | tooth pair |
| 256 | leg portion |
| 258 | axial tooth portion |
| 259 | inner tooth surface |
| 260 | winding |
| 265N/265S | magnetic poles |
| 270 | heat pipe |
| 275 | heat sink |
| 350 | rotor body |
| 352 | rotor first end |
| 354 | rotor second end |
| 355 | magnet assembly |
| 357 | rotor outer surface |
| 410 | radial gap |
| 415 | fill material |
| 500 | method |
| 510 | integrated housing |
| 520 | stator cores |
| 525 | windings |
| 530 | stator stages |
| 535 | couple stages to housing |
| 540 | position rotor |
| 550 | thrust tube/screw ass'y |
| 560 | operate actuator |
| 570 | drive rotor/thrust tube |
| 575 | passive cooling |
| 585 | active cooling |
| A | longitudinal axis |

TABLE 1-continued

| Figure References | |
| --- | --- |
| F | flux path |
| G | air gap |
| ID | inner core diameter |
| OD | outer core diameter |
| R | Rotational Direction |

The invention claimed is:

1. An integrated motor linear actuator system comprising:

a stator comprising a plurality of stator stages disposed along an axial extent within a housing, each stator stage having a winding and a stator core disposed about a common longitudinal axis, with a plurality of stator teeth configured to guide magnetic flux generated by the winding;

a rotor disposed along the longitudinal axis with a plurality of magnetic poles disposed circumferentially about the rotor, adjacent the stator teeth, wherein the stator stages are configured to drive the rotor into rotational motion about the longitudinal axis, via the magnetic flux;

a nut and screw assembly operationally coupled to the rotor; and a thrust tube coupled to the nut, wherein the nut and screw assembly is configured to convert the rotational motion of the rotor about the longitudinal axis into linear motion of the thrust tube along the longitudinal axis;

wherein the magnetic flux is generated in response to current loops induced in the respective windings, the current loops extending about the rotor, transverse to the longitudinal axis;

wherein the rotor comprises a hollow core rotor body disposed coaxially about the nut and screw assembly, extending longitudinally from a first end adjacent a rotor hub proximate a back end of the housing to a second end proximate a front end of the housing, with the nut disposed within the hollow core rotor body; and a plurality of permanent magnets defining the magnetic poles in an alternating arrangement disposed along an outer surface of the hollow core rotor body, extending along the axial extent of the stator, adjacent the stator teeth across an air gap.

2. The system of claim 1, wherein:

each current loop defines a ring or annulus oriented about the rotor, substantially perpendicular to the longitudinal axis;

the current loop induced in each respective winding is disposed between the stator teeth and an outer radius of an annular body portion of the respective stator core; and/or the stator teeth are disposed between the current loop induced in the respective winding and the magnetic poles disposed circumferentially about the rotor, across the air gap.

3. The system of claim 1, wherein the magnetic flux defines a flux path extending radially along the respective stator core and axially along alternating pairs of the stator teeth, in which the flux path is defined parallel and antiparallel to the longitudinal axis, respectively.

4. The system of claim 1, wherein alternating pairs of the stator teeth are disposed along opposing sides of each respective winding, extending in opposing directions along the longitudinal axis, adjacent the rotor, with the windings disposed between the alternating pairs of the stator teeth.

5. The system of claim 4, wherein the alternating pairs of the stator teeth define radial gaps on opposing sides of each respective winding, and further comprising a nonmagnetic fill material or potting compound disposed in the radial gaps, between the windings and the respective stator teeth, or between the windings and the annular body portions of the respective stator cores, or a combination thereof.

6. The system of claim 1, wherein the stator cores are formed of or comprise a polymer-based or composite material having lower density than iron, with magnetic properties selected for guiding the magnetic flux through the respective stator teeth, along a flux path oriented along the longitudinal axis adjacent the rotor, substantially parallel to one or more of the magnetic poles.

7. The system of claim 1, wherein the stator cores each comprise first and second axially engaged annular body portions with first and second alternating sets of the stator teeth extending in opposing directions therefrom, wherein the windings are engaged between the respective annual body portions and alternating sets of stator teeth.

8. The system of claim 1, further comprising a conductive or convective cooling system configured to dissipate heat generated by the stator stages to the housing, wherein a temperature of the system is maintained within a desired range for operation of the nut and screw assembly and thrust tube, absent active cooling of the respective windings or stator cores.

9. The system of claim 1, further comprising a heat pipe configured for convective flow of a thermally conductive fluid between one or more of the stator stages and the housing.

10. The system of claim 1, wherein the nut and screw assembly comprises a roller nut coupled to a proximal end of the thrust tube and a threaded screw shaft rotationally coupled to the rotor, the roller nut being engaged with the threaded screw shaft to convert the rotational motion of the rotor such that a distal end of the thrust tube reciprocates along the longitudinal axis, opposite the proximal end and outside the actuator housing.

11. The system of claim 1, wherein the stator stages comprise a plurality of sequentially ordered, modular stator stages with the stator teeth clocked about the longitudinal axis by an angle to define three different phases, and wherein the magnetic poles extend axially along a set of at least three of the sequentially ordered, modular stator stages, having the three different phases.

12. The system of claim 1, wherein the nut is wholly disposed within the hollow core rotor body, with the rotor coaxially disposed within the stator cores.

13. The system of claim 1, wherein the thrust tube is configured to prevent rotation during the linear motion of the thrust tube along the longitudinal axis.

14. A method for operating an integrated motor linear actuator system, the method comprising:

inducing current in a stator comprising a plurality of stator stages disposed along an axial extent within a housing, wherein the stator stages comprise a plurality of windings, each of the windings extending about a longitudinal axis within a stator core;

guiding magnetic flux through the stator cores responsive to the current, wherein the magnetic flux defines a flux path extending radially from each stator core to a plurality of stator teeth distributed circumferentially about the longitudinal axis, and axially along the stator teeth, along the longitudinal axis at an inner diameter of the respective stator core;

driving a rotor having a hollow core rotor body into rotation about the longitudinal axis responsive to the magnetic flux, wherein the rotor comprises a plurality of magnets defining magnetic poles distributed circumferentially about an outer surface of the hollow core rotor body, extending along the axial extent of the stator, adjacent the stator teeth across an air gap; and converting the rotation of the rotor into linear motion of a thrust tube, wherein the thrust tube translates along the longitudinal axis in response to the rotation of the rotor;

wherein inducing the current comprises defining a plurality of current loops extending circumferentially about the rotor in the windings, transverse to the longitudinal axis; and wherein converting the rotation of the rotor to the linear motion of the thrust tube comprises:

rotationally engaging the rotor with a nut and screw assembly operationally coupled to the rotor, wherein the hollow core rotor body is disposed coaxially about the nut and screw assembly, extending longitudinally from a first end adjacent a rotor hub proximate a back end of the housing to a second end proximate a front end of the housing, with the nut disposed within the hollow core rotor body along the longitudinal axis, and operationally coupling the nut with the thrust tube such that the thrust tube translates in one or more opposing directions along the longitudinal axis, in response to the rotation of the rotor in one or more opposing directions about the longitudinal axis.

15. The method of claim 14, wherein guiding the magnetic flux comprises defining a flux path along alternating, circumferentially adjacent pairs of the stator teeth, the alternating, circumferentially adjacent pairs of stator teeth extending radially on opposing sides of each of the windings and axially in the opposing directions along the longitudinal axis, between the respective windings and the outer surface of the rotor.

16. The method of claim 15, wherein driving the rotor comprises coupling the alternating, circumferentially adjacent pairs of stator teeth with alternating, adjacent pairs of the magnetic poles distributed circumferentially about the outer surface of the hollow core rotor body, via the flux path extending across the air gap.

17. The method of claim 14, further comprising inducing the current in the plurality of windings extending within a series of such stator cores distributed along the longitudinal axis, wherein the respective stator teeth are clocked about the longitudinal axis by an electrical angle selected to define three different phases, and wherein the magnetic poles distributed about the outer surface of the hollow core rotor body extend axially along at least three of the stator cores, having each of the three different phases.

18. The method of claim 14, further comprising:

convective cooling the stator cores with a heat pipe system configured to transport heat from the stator cores to a stator housing disposed about the stator cores; and/or conducting heat generated by the windings to a stator housing disposed about the respective stator cores via a nonmagnetic fill material or potting compound disposed between the windings and the stator teeth, or between the windings and an annular body portion of the respective stator cores, or a combination thereof.

19. The method of claim 14, wherein the nut is wholly disposed within the hollow core rotor body, with the rotor coaxially disposed within the stator cores.

20. The method of claim 14, wherein the thrust tube is configured to prevent rotation when the thrust tube translates along the longitudinal axis.

21. An integrated motor actuator comprising:

a stator comprising a plurality of stator stages disposed along an axial extent within a housing, each stator stage having a winding and a stator core disposed about a common longitudinal axis, with a plurality of stator teeth configured to guide magnetic flux generated by the winding; and a rotor disposed along the longitudinal axis, within the plurality of stator stages, the rotor having a plurality of magnetic poles distributed circumferentially about an outer surface, adjacent the stator teeth;

wherein each winding defines a current loop disposed about the rotor when current is induced in the winding, transverse to the longitudinal axis;

wherein alternating pairs of the stator teeth extend on opposing sides of the current loops induced in the respective windings, the alternating pairs of stator teeth configured to drive the rotor into rotational motion about the longitudinal axis via coupling with the magnetic flux;

and further comprising:

a nut and screw assembly operationally coupled to the rotor; and a thrust tube coupled to the nut, wherein the nut and screw assembly is configured to convert the rotational motion of the rotor about the longitudinal axis into linear motion of the thrust tube along the longitudinal axis;

wherein the rotor comprises a hollow core rotor body disposed coaxially about the nut and screw assembly, extending longitudinally from a first end adjacent a rotor hub proximate a back end of the housing to a second end proximate a front end of the housing, with the nut disposed within the hollow core rotor body; and further comprising a plurality of surface-mounted permanent magnets circumferentially disposed about the outer surface of the hollow core rotor body, extending along the axial extent of the stator, wherein the surface-mounted permanent magnets define the magnetic poles.

22. The integrated motor actuator of claim 21, wherein magnetic flux defines a flux path extending radially along the alternating pairs of the stator teeth in each stator stage, on the opposing sides of the current loops induced in the respective windings, and:

wherein the flux paths extend axially between the current loops induced in the respective windings and the outer surface of the rotor, in the opposing directions along the longitudinal axis; and/or wherein the flux path defines the alternating pairs of stator teeth with opposite polarity, adapted to couple with an adjacent pair of the magnetic poles disposed about the outer surface of the hollow core rotor body, adjacent the respective stator teeth across an air gap.

23. The integrated motor actuator of claim 21, further comprising:

a convective cooling fluid loop disposed in thermal contact with the stator cores and configured to transport heat from the respective windings to the housing;

a heat pipe system configured to transport heat from the stator cores to the housing; and/or a nonmagnetic fill material or potting compound disposed between the windings and the respective stator teeth, or between the windings and annular body portions of the respective stator cores, or a combination thereof, wherein the nonmagnetic fill material or potting compound is configured to conduct heat from the windings to the respective stator cores.

24. The integrated motor actuator of claim 21, wherein the stator cores are formed of a polymer-based or composite material having lower density than iron, with magnetic properties selected for guiding the magnetic flux generated by the respective windings.

25. The integrated motor actuator of claim 21, wherein:
the alternating pairs of stator teeth extend in the opposing directions along the longitudinal axis between the respective winding and the outer surface of the rotor, to respective radial gaps on the opposing sides of each current loop; and/or
the alternating pairs of stator teeth are circumferentially adjacent about the longitudinal axis, one tooth in each pair having a leg portion extending radially on a first side of the respective winding and an axial portion extending from the leg portion to the open end on a second side of the respective winding, opposite the first side, and another tooth in each pair having a leg portion extending radially on the second side of the respective winding and an axial portion extending from the leg portion to an open end on the first side of the respective winding, opposite the second side.

26. The integrated motor actuator of claim 21, further comprising:
at least three of the plurality stator stages being disposed along the longitudinal axis in sequential order, wherein the at least three stator stages are clocked about the longitudinal axis by an angle to define three different phases, in the sequential order; and
wherein the magnetic poles distributed about the outer surface of the hollow core rotor body extend axially along the at least three stator stages defining the three different electrical phases, in sequential order.

27. The integrated motor actuator of claim 21, wherein the nut is wholly disposed within the hollow core rotor body, with the rotor coaxially disposed within the stator cores.

28. The integrated motor actuator of claim 21, wherein the thrust tube is configured to prevent rotation during the linear motion of the thrust tube along the longitudinal axis.

* * * * *